(12) United States Patent
Hirschberg

(10) Patent No.: US 6,440,449 B1
(45) Date of Patent: Aug. 27, 2002

(54) METHODS OF INFUSING PHYTOCHEMICALS, NUTRACEUTICALS, AND OTHER COMPOSITIONS INTO FOOD PRODUCTS

(76) Inventor: Edward Hirschberg, 25 Tamarack Dr., Hillsborough, CA (US) 94010

( * ) Notice: Subject to any disclaimer, the term of this patent is extended or adjusted under 35 U.S.C. 154(b) by 0 days.

(21) Appl. No.: 09/231,536

(22) Filed: Jan. 14, 1999

Related U.S. Application Data

(60) Provisional application No. 60/071,081, filed on Jan. 15, 1998.

(51) Int. Cl.⁷ .............................. A61K 47/00; A23L 1/27; A23L 1/212; A23B 4/033; A23B 4/037
(52) U.S. Cl. ..................... 424/439; 426/250; 426/455; 426/456; 426/506; 426/426; 426/650; 426/640; 426/465; 426/444
(58) Field of Search ................... 426/466, 456, 426/103, 330.5, 425, 426, 570, 640, 465, 250, 455, 506, 650, 444; 424/439, 441, 484, 400

(56) References Cited

U.S. PATENT DOCUMENTS

| | | | |
|---|---|---|---|
| 1,886,931 A | 11/1932 | Alexander | |
| 2,317,397 A | 4/1943 | Noyes | |
| 2,419,877 A | 4/1947 | Birdseye | |
| 4,183,963 A | 1/1980 | Brimelow et al. | |
| 4,355,050 A | 10/1982 | Butland | |
| 4,683,141 A | 7/1987 | Lewis et al. | |
| 5,000,972 A | 3/1991 | Nafisi-Movaghar | |
| 5,037,662 A | 8/1991 | Poulose et al. | |
| 5,368,873 A | * 11/1994 | Aebi et al. | |

FOREIGN PATENT DOCUMENTS

HU 47823 4/1910

* cited by examiner

*Primary Examiner*—Edward J. Webman
(74) *Attorney, Agent, or Firm*—Townsend & Townsend & Crew LLP

(57) ABSTRACT

This invention provides methods of infusing compositions including phytochemicals, nutraceuticals such as vitamins, herbal extracts, and medicinals into food products, including, e.g., juices, fruits, vegetables, and meats, etc. The resulting infused food products are consumable products which are helpful in alleviating dietary insufficiency and/or to prevent or treat diseases such as cancer, heart disease, Alzheimer's disease, etc.

36 Claims, No Drawings

METHODS OF INFUSING PHYTOCHEMICALS, NUTRACEUTICALS, AND OTHER COMPOSITIONS INTO FOOD PRODUCTS

CROSS REFERENCE TO RELATED APPLICATIONS

This application is a continuation-in-part of U.S. Ser. No.: 60/071,081 filed Jan. 15, 1998, entitled "Methods of Infusing Phytochemicals into Food Products" by Edward Hirschberg, and claims priority thereto. The Ser. No. 60/071,081 application is incorporated herein by reference.

FEDERALLY SPONSORED RESEARCH OR DEVELOPMENT

Not applicable.

FIELD OF THE INVENTION

This invention provides methods of infusing compositions including phytochemicals, nutraceuticals such as vitamins, herbal extracts, and medicinals into food products, including, e.g., juices, fruits, vegetables, and meats, etc. The resulting infused food products are consumable products which are helpful in alleviating dietary insufficiency and/or to prevent or treat diseases such as cancer, heart disease, Alzheimer's disease, etc.

BACKGROUND OF THE INVENTION

Fruits, vegetables, vitamins, minerals, and phytochemicals included in a diet can enhance disease resistance. Food products such as fruit and vegetables commonly have moisture reduced through various techniques such as freeze drying, vacuum drying, air drying, osmotic dehydration, etc. to enhance storage, consumption, and shippability.

It has been noted in the conditioning and preservation of food products in their natural state that all food products contain soluble materials which may be lost or altered by contact with solutions of many types. For example, if meats, vegetables, or fruits are placed in water, the water has a tendency to dissolve out the soluble components of these food products, thereby altering their appearance and flavor.

There have been previous attempts to modify food products with useful ingredients. Some of the previous work involved mixing vitamin extracts into a fresh fruit mass, e.g., Elliot Ritchie Alexander, "Vitamin Fruit Composition," U.S. Pat. No. 1,886,931, and Clarence Birdseye, "Process of Improving and Preserving Food Products," U.S. Pat. No. 2,419,877. Others involved adding flavors into frozen foodstuffs, such as those disclosed in Harry A. Noyes, "Process of Conditioning Foods," U.S. Pat. No. 2,317,397. More recent work described using osmosis to dehydrate and preserve foods, e.g. Brimelow and Brittain, "Contiguous Food Impregnation," U.S. Pat. No. 4,183,963, and Peter Butland, "Process for Producing a Natural Fruit Candy," U.S. Pat. No. 4,355,050. There have also been efforts made to infuse certain flavors into foods using osmosis, such as those disclosed in Lewis and Lewis, "Dehydrated Vegetables," U.S. Pat. No. 4,683,141, Karim Nafisi-Novaghar, "Method of Making Dried Fruits," U.S. Pat. No. 5,000,972, and Aebi, et al., "Process for Preparing Dehydrated Vegetable Products," U.S. Pat. No. 5,368,873, and using a degradation enzyme, e.g. as in Poulose and Boston, "Enzyme Assisted Degradation of Surface Membranes of Harvested Fruits and Vegetables," U.S. Pat. No. 5,037,662. Some have also explored methods of preserving fruits and vegetables using deep freezing, e.g., Berey et al., "Fruit and Vegetable Preservation Using Deep Freeze—by Complete or Partial Withdrawal of Free Water and Partial Replacement of it with Additives, Improving Appearance, Flavour and Shelf-life," e.g., in Hungarian patent HU 47823.

However, none of these prior art methods are satisfactory in terms of their ability to infuse nutrients into food products in general. The reason is that the above processes result in a loss of phytochemicals, vitamins and minerals from the food, resulting in a corresponding loss of nutritional value and decreasing the disease-preventative value of the food. A need exists in the art to provide improved methods of food preparation and storage, as well as to provide efficient mechanisms for infusing osmotically dried fruits, vegetables, and other food products. This invention fills these and other needs.

SUMMARY OF THE INVENTION

Food products can have their moisture reduced through various techniques such as freeze drying, vacuum drying, air drying, osmotic dehydration, etc. One process described herein uses osmotic dehydration, in which higher osmotic pressure outside a food particle causes moisture to migrate out of the food. This is done with sugars or solutions of sugars, e.g., high fructose corn syrup, or others. During the migration time, solutes in the solutions fill voids left by the water that was removed by infusion. In the invention, flavors, colors, vitamins, minerals, and phytochemicals such as isoflavonals, lycopene, resveratol, indocarbonals, anthocyanins, etc., as well as, e.g., soluble fiber, are infused along with the osmotic dehydration solute by adding these desired additives in controlled dosage to the osmotic dehydration solution.

The invention provides a method of infusing a composition into a food product by increasing the brix of an osmotic dehydration solution containing the food product, over a period of time. The food product is incubated with the composition, thereby infusing the composition into the food product. These steps are optionally performed separately, sequentially, or simultaneously.

Typically, the composition used in the method is a phytochemical, a nutraceutical, or other desirable food additive. In one significant aspect of the invention, the food product is predried before the composition is infused into the food product. Alternatively, the osmotic dehydration solution optionally includes the composition to be infused into the food product.

The brix of the osmotic dehydration solution is typically varied from about 20° B. to about 80° B. The brix of the osmotic dehydration solution is optionally changed daily, e.g., for a period of at least about one week. The method of the present invention can be performed at various temperatures such as about room temperature or up to about 50° C., e.g., where the brix of the osmotic dehydration solution is about 77° B. The infusion method further comprises stirring or circulating the osmotic dehydration solution, thereby increasing the rate of infusion of the composition into the food product. In one example, the infusion method is performed where the food product includes a strawberry and the brix of the osmotic dehydration solution is about 40° B. In another example, the food product can include a marionberry and the osmotic dehydration solution includes high fructose corn syrup (HFCS). In another example, the food product used in the present invention includes a sliced cranberry, and the osmotic dehydration solution includes a phytochemical and HFCS, and the brix of the osmotic dehydration solution is about 77° B.

In another aspect of the invention, when the food product includes fresh sliced carrot, and the brix of the osmotic dehydration solution is about 77° B., the infusion method further includes heating the osmotic dehydration solution containing HFCS, Saw Palmetto, and Gingko Biloba, and incubating the solution overnight. Typically, the osmotic dehydration solution includes a dehydration solute such as high fructose corn syrup, dextrin, starch, gelatin, pectin, juice concentrate, or soy isolate. Optionally, the food product can be coated with a coating substance such as gelatin, pectin, or starch to form a coated food product, and the phytochemical is infused into the coated food product.

The dehydration solution is optionally heated, and/or continuously circulated. The solution is typically circulated through a tube or a pipe, or passed over a perforated conveyor in either a continuous or discontinuous process. In yet another aspect of the invention, the food product is freeze dried to 10% or lower residual moisture before infusion occurs.

Compositions to be infused include can be phytochemicals, or nutraceuticals such as: vitamins, minerals, isoflavoronals, lycopene, resveratol, indocarbonals, anthocyanins, soluble fiber, high protein rice, soy isolate or others. Optionally, the composition to be infused can include a flavor, or a color. The food product is optionally a vegetable such as a carrot, or bell pepper, e.g., where the osmotic dehydration solution includes a low dextrose and L-Carnitine.

In a further aspect of the invention, excess water is removed by drying a mixture of the food product and the composition after incubation of the food product with the composition. The food product includes, e.g., fruit, fruit juice, a vegetable, vegetable juice, ground liver, chicken, salmon, or the like. For example, the food product can be an apple, a carrot, or a pet treat. The composition used in the method of this invention can be a medicinal capable of providing a medical or dietary benefit to a human or an animal. For example, in one embodiment, prunes or prune juices are infused with Chinese herbal medicine to form a mixture for treatment or prevention of irritable bowel syndrome.

In one aspect of the invention, where the food product is a fruit juice or vegetable juice, and the composition is a phytochemical, the phytochemical is infused into the fruit juice or vegetable juice and further formed into a solid or semisolid mixture.

The mixture thus formed can be made into a trail mix, e.g., with at least two kinds of food products infused with phytochemicals. In a preferred embodiment, the mixture contains high protein rice, or soy isolate. In another preferred embodiment, the mixture is formed into a firm mass of material mixed with pectin or gelatin. Alternatively, the mixture is coated with a coating substance such as gelatin, pectin, or starch.

In a further aspect of the invention, a flavoring is infused into a fruit using the following steps: (a) soaking the fruit in a solution of potassium sorbite, calcium lactate, citric acid, glycerol, and the flavoring for at least three days; (b) removing 20% of the solution by weight each successive day; (c) replacing the removed solution with about 77° B. brix HFCS until the brix of the solution reaches about 65° B.; (d) rinsing the solution off the fruit or vegetable; and (e) drying the fruit or vegetable. The fruit typically includes, e.g., blueberry, strawberry, marionberry, cranberry, or the like. Optionally, anthocyanins, vitamin C, or other compounds are added to the solution.

DEFINITIONS

As used herein, the following terms have the meanings ascribed to them unless specified otherwise. All other terms have their meanings as commonly understood by one skilled in the art.

The term "food product" refers to material of either plant or animal origin, or of synthetic sources, that contain an essential body nutrient such as a carbohydrate, protein, fat, vitamin, mineral, etc. Examples include meats, fruits, vegetables, grains, nuts, and the like.

The term "phytochemical" refers to dietary compounds or chemicals derived from plants which provide a health benefit when consumed by humans or animals. Examples of such compounds or chemicals are lycopene, isoflavones, etc.

The term "nutraceutical" refers any compounds or chemicals that can provide dietary or health benefits when consumed by humans or animals. Examples of nutraceuticals include vitamins, minerals, and others.

The term "osmotic dehydration" refers to the process which occurs when food products are submerged in a solution having higher concentration of solutes outside of the food product than inside of it, and when water is caused to migrate from within the food product to outside the food product, thereby causing the food product to be dehydrated.

The term "brix" refers to a unit measurement for measuring the density of the concentration of a chemical such as sugar in a solution. As used in the art, brix refers to a concentration in percent of sugar by weight according to the Brix scale. Brix scale here refers to a hydrometer scale for sugar solutions so graduated that its readings in degrees Brix at a specified temperature represent percentages by weight of sugar in a solution. See Webster's Third New International Dictionary, unabridged, published by G. & C. Merriam Company, Springfield, Mass.

The term "pretreating" refers to a process where a food product is treated chemically or physically before it is infused with a composition.

The term "predried" refers to a process where a food product is dehydrated by various means before it is infused with a composition. For example, the means of dehydration can be by freeze drying such that the food product is in freeze dried format when it is incubated with the composition.

The term "HFCS" refers to high fructose corn syrup.

The term "pet treat" refers to a food product consumed by a pet or livestock (i.e. a non-human, domesticated animal), such as a dog or cat biscuit, or other dog or cat treat. Examples of pets includes dogs, cats, birds, snakes, turtles, frogs, toads, rabbits, rats, mice, gerbils, hamsters, fish, and the like. Examples of livestock include pigs, cattle, cows, horses, chickens, ducks, fish, and other animals. Animal treats can, of course, also be produced for undomesticated wild animals.

The term "herbal medicine" refers to naturally occurring compositions such as Chinese herbal medicine that are used by Traditional Chinese Medicine practitioners in curing diseases. Such compounds are generally derived from plant sources. Examples of herbal medicine include Dang Shen, Hua Xiang, Fang Feng, Yin Chen, Fu Ling, Bai Zhi, Bai Shao, Mu Xiang, Wu Wei Zi, etc.

The term "coating substance" refers to a composition that can be applied to the food product to be infused a phytochemical or other composition to form a protective membrane or coating or layer over the food product. Examples of such coating substance are gelatin, pectin, and starch.

The term "trail mix" refers to a food product containing at least two kinds of fruits, vegetables, nuts, or other foods.

In the methods of the invention, at least one of the at least two kinds of food products is infused with a composition such as phytochemical, or nutraceutical.

DESCRIPTION OF THE PREFERRED EMBODIMENT

The present invention relates to processes to infuse phytochemicals, nutraceuticals, and other compositions into food products, so as to form mixtures that can be consumed by humans or animals. The method disclosed herein can be used to produce snacks or other food items containing vitamins, minerals, other nutrients or medicinals so as to provide dietary benefits to humans or animals.

INFUSION CONDITIONS

The infusion process is conducted by gradually increasing the brix of the osmotic dehydration solution from 20° B. to 65° B., usually daily, typically over a one to two week period. Optionally, the infusion is speeded up by the use of heat, i.e., from ranges of 20–80° C., optionally 30–70° C., and generally 40–60° C., and preferably at about 50° C., and a high strength of solution, e.g., 77° B., to under 24 hours. Stirring of the solution is optionally used to speed the infusion. The brix of the osmotic dehydration solution is typically varied from about 20° B. to about 80° B. Preferably, the brix can be from 30–70° B., or from 40–60° B., or from 60–80° B. The brix of the osmotic dehydration solution is optionally changed daily, e.g., for a period of at least about one week. It is expected that one of skill in the art is fully able to adjust the brix of a solution by adding solute to the solution, and/or by partial or complete replacement of the solution.

The method of the present invention can be performed at various temperatures, such as at about room temperature or up to about 50° C. to thin out the dehydration solute for greater absorption. Optionally, the brix of the osmotic dehydration solution is from 20–80° B., depending on the desired condition of infusion. For example, in one embodiment, infusion is conducted at about 77° B.

For example, the infusion method can be performed when the food product includes a strawberry with the brix of the osmotic dehydration solution being about 40° B. In another embodiment, the food product can include a marionberry and the osmotic dehydration solution includes high fructose corn syrup (HFCS). Optionally, the food product used in the present invention can include a sliced cranberry, and the osmotic dehydration solution includes a phytochemical and HFCS, and the brix of the osmotic dehydration solution is about 77° B.

The osmotic dehydration solution includes a sugar component such as high fructose corn syrup. Typically, it includes at least about 35% to about 100% fructose, and preferably about 42% to about 90% fructose. The balance of the sugar may be comprised of dextrose or any of a number of saccharide materials including monosaccharides, disaccharides and polysaccharides and their degradation products, e.g., pentoses including aldopentoses, ketopentoses like xylose and arabinose, a deoxyaldose like rhamnose, hexoses and reducing saccharides such as aldohexoses like glucose, galactose and mannose; the ketohexuloses, like sorbose and xylulose; disaccharides, like maltulose, lactose and maltose; nonreducing disaccharides such as a sucrose, other polysaccharides such as dextrin and raffinose, and hydrolyzed starches which contain as their constituents oligosaccharides. The balance of the sugar may be of a low molecular weight so as to offer a substantial effect in increasing the osmotic pressure of the sugar solution. The balance of the sugar may also be comprised of polyhydric alcohols such as glycerol and the like. When polyhydric alcohols are employed, they preferably comprise only about 1 to about 10% of the sugar component.

The infusion can be performed in various containers readily available in the art. For example, the containers for the infusion are typically made of plastic or other polymer materials. Other materials that can be used for the container include stainless steel, aluminum, glass, or other ceramics. When applicable, the heat source can be applied to the container internally or externally, or both, by a heating means such as a heating rod, open burner, closed burner, electrical heating elenent, or the like.

PHYTOCHEMICALS USED IN INFUSION

The osmotic dehydration solution optionally includes any of a variety of vitamins, including vitamin A (e.g., vitamin $A_1$, retinol, axerophthol, α-carotene, β-carotene, γ-carotene), B vitamins (e.g., $B_1$ vitamins including: thiamin, aneurin, thiamine, pyrophosphate, cocarboxylase; $B_2$ vitamins including riboflavin, vitamin G, lactoflavin, hepatoflavin, ovoflavin, verdoflavin, riboflavin mononucleotide, FMN, riboflavin dinucleotide, FAD), Vitamin C (ascorbic acid, antiscorbutic vitamin, dehydroascorbic acid), D (antirachitic vitamin, vitamin $D_2$, $D_3$, cholecalciferol, etc), Vitamin E, Vitamin K, and the like.

For an overview of vitamins, minerals and biologicals, and their sources and formulations, see, Kirk-Othmer (1984) Encyclopedia of Chemical Technology, $3^{rd}$ edition, volume 24 A, Wiley-Interscience Publication, John Wiley & Sons, New York, and Kirk-Othmer (1994) Encyclopedia of Chemical Technology, $4^{th}$ edition, volume 11, A Wiley-Interscience Publication, John Wiley & Sons, New York. For additional reference materials, see also, The Merck Index (1989), An Encyclopedia of Chemicals, Drugs, and Biologicals, $11^{th}$ Edition, Published by Merck & Co., Inc., Rahway, N.J. (or any later versions of the Merck Index).

The solution optionally includes flavoring compounds or other food additives (e.g., colors and coloring agents, antioxidants, preservatives, flavor enhancers, enzymes, emulsifiers, firming agents, formulation aids, nonnutritive sweeteners, processing aids, stabilizers, etc.) such as those described Kirk-Othmer (1994) Encyclopedia of Chemical Technology, $4^{th}$ edition, volume 11, supra or any other available source. Similarly, the solution can include oils, solubilizers and the like to aid in solubilizing components which have poor solubility in aqueous solutions. After infusion, the food product is optionally further dried for stability and convenience of use. Other food processing techniques are also applicable and described id. Some foods that have low structural integrity or need a skin to transfer them are coated with an edible polymer. This can include liquids that have been solidified with gums, pectins, etc., and are thereafter coated with edible polymers.

In one aspect, the present invention provides for fruits and vegetables with enhanced properties such as higher vitamin content, soluble fiber, amino acids, or the like. Using the methods herein, it is possible to add fiber, vitamins, flavorings, preservatives, and the like, to most fruits and vegetables, as well as to many other foods. In one embodiment, it is desirable to fortify a fruit or vegetable with a vitamin naturally present in the vegetable, thus giving it superior nutritional value. For instance, a carrot can be fortified with vitamin A. In other embodiments, it is desirable to fortify the fruit or vegetable with vitamins, minerals, antioxidants, fiber or the like, which are not naturally present in the fruit or vegetable.

In another aspect, herbal or other natural products with beneficial qualities such as ginseng, taro root extract, other Chinese herbal medicine, or the like can be added to the fruit. Similarly, natural hormones such as melatonin can be added to provide various therapeutic benefits (e.g., to combat insomnia), as can pharmaceuticals. One of skill will appreciate that there are many formulations of vitamins, medicinals, herbal medications, natural hormones, etc., which are broadly available, which can be added to the food products by the methods of the invention.

FREEZE DRYING BEFORE INFUSION

All food products contain moisture. The process of osmotic dehydration and infusion are limited by the differential in osmotic pressure from outside the food product and a lesser pressure from within the food product. The process of overcoming the inner pressure is difficult and time consuming and never completely replaces all of the residual moisture in the food product.

The process described here starts by freeze drying the food product to under 10% residual moisture. The dry product can be thought of as a dry sponge with voids where moisture previously was and which has little resistance from absorbing media.

One application of the infusion method includes placing the food product in a container and adding high fructose corn syrup. The syrup essentially fills the voids left as the moisture is removed. The process can be as short as minutes to 24 hours, e.g., until the syrup has been substantially absorbed. The product is removed, rinsed of surface syrup (e.g., in water) and vacuum dried to the desired moisture level.

Ways that the absorption can be significantly speeded up include using a hot syrup, or by heating the container in which the absorption takes place, in order to thin out the syrup. Additionally, circulating the syrup effectively improves absorption due to dynamic contact of the food product with the syrup. Since food products are filled with air which replacing the moisture from within, they tend to float and must be held submerged. Some of the food products can become crushed or deformed, so care is taken to prevent damage during processing.

MIXING AND CIRCULATING THE INFUSION SOLUTION

An additional process of continuously moving both the food product and syrup has been devised. One process includes pumping both the food product and syrup (or other osmotic dehydration solution) through tubes or pipes. Alternatively, both can be mechanically conveyed, or the food product can be conveyed through the osmotic dehydration solution. For example, the food product can be passed over a perforated conveyer through the osmotic dehydration solution. The food product exits the solution on the conveyor and can subsequently be rinsed, oiled, placed in trays and redried. While freeze drying facilitates the osmotic dehydration and infusion, alternative media can be used other than high fructose corn syrup, including dextrin, starch, gelatin, pectin, juice concentrate, etc. The ability to use solutions other than HFCS is a particular benefit of the process outlined herein.

APPLYING THE INFUSION TO VARIOUS FOOD PRODUCTS

Food products can be formed into a particular shape, e.g., juice concentrate (e.g., from fruit or vegetable homogenate). For example, food products can be shaped into cubes, which can be of any geometric shape, which are then mixed with fruit or vegetable powders having phytochemicals. The mixtures are combined with high fructose corn syrup, and are then dried to form a final product consumed as a snack. Alternatively, the above juice concentrate can be mixed with high protein rice, or soy isolate before infusion with phytochemicals, and a different snack containing high protein rice or soy isolate can be manufactured following a similar process.

Another process to infuse phytochemicals into food product is to start with juice drinks containing phytochemicals. Adequate amounts of pectin or gelatin are mixed with the juice drinks so as to form a firm mass or ball. The firm ball can be cut into various shapes, e.g., dices, or cubes. Next, HFCS is incorporated into the juice cubes. Later, the juice cubes are dried and infused with phytochemicals.

Optionally, the cubes are coated with gelatin pectin, starch, or other coating substances prior to or after drying. After the infusion with phytochemicals, or medicinals, the food product is formed into a bar. Such bars of infused food products can provide a strong medical benefit to the body. Depending on the particular medicinal that is being infused into the food product, they can be effective in the prevention of cancer, heart disease, Alzheimer's, and the AIDS disease. For example, anti-oxidants have been implicated in reducing the risk of these diseases.

Another variation of the above is to form a trail mix of food product containing a variety of fruits, each infused with a phytochemical, or medicinal, so as to provide the consumer with a combined medical or dietary benefits to the body.

INFUSED PET TREATS

To produce pet treats infused phytochemicals, pet foods such as ground liver, ground chicken, and others are formed into cubes. Then infusion is performed with the pet food cubes to infuse medicinals or phytochemicals for pets, or other livestock, or even for wild animals. These pet treats infused with medicinals can be used a medicine to prevent, ameliorate, or cure diseases. These infused treats are more effective than pills because they are more acceptable to the animals. For different pets, different starting food products are used. For example, for cats, ground salmon meats can be used, while for horses, apples and carrots can be infused.

INFUSING VARIOUS FRUITS AND VEGETABLES

Specific preferred examples of infusing fruits with various phytochemicals are described below. One of skill will appreciate that a variety of parameters can be altered to achieve essentially similar results.

Blueberries are soaked with equal parts of water and solution containing potassium sorbate, calcium lactate, citric acid, glycerol and flavoring for 3 days. Each successive day, 20% of the solution by weight is removed and replaced with 77° B. brix HFCS. This is continued until the brix reaches 65° B. The blueberry solution is drained, the blueberries rinsed, oiled, and placed into trays and vacuum dried to desired dryness. Anthocyanins and vitamin C are added in early exchanges for enhancement.

Similarly, strawberries are infused under modified conditions from above. For example, the starting solution containing the phytochemical can be about 40° B. brix. In the case of cranberries, the fruits are sliced and freeze dried prior to infusion. Subsequently, the slices are soaked with 77° B. HFCS containing phytochemicals to be infused. In the case of marionberries, the fruits are infused with phytochemicals following similar osmotic dehydration and infusion procedure as described above.

Prunes or prune slices are combined with prune concentrate and infused with Chinese herbal medicine extract such as those disclosed in Bensoussan, et al, "Treatment of Irritable Bowel Syndrome with Chinese Herbal Medicine", JAMA, Vol. 280, No. 18, pp. 1585–1589 (1998). The mixture is redried, and formed into a snack form such as a bar. Such snacks can function as a laxative, and can be used in the prevention of colon cancer. Alternatively, prune juice can be mixed with the above mentioned Chinese herbal medicine and gelatin, and forming a gel mixture which is subsequently soaked in prune concentrate. The Gelle mixture is then freeze dried, pulverized, and formed into a tablet or a discrete piece.

Many vegetable juices are infused with phytochemicals, nutraceuticals, and other compositions using the infusion methods of this invention. In some cases, the vegetables juices are mixed with gelatin containing one or more nutraceuticals and then freeze dried before further infusion.

Other vegetables such as carrots, bell peppers, cucumbers, tomatoes, eggplants, celery, sprouts, etc. are freeze dried first. They are then soaked with a low dextrose (e.g., Maltodextrose) containing L-Carnitine in order for the infusion to occur. In the case of fresh sliced carrots, they are first soaked in a 77° B. brix HFCS containing Saw Palmetto, Gingko Biloba. Next, they are incubated overnight in a heated solution in order to speed up the infusion.

Many other aspects will be apparent on reading this disclosure. All references cited herein are incorporated by reference in their entirety.

What is claimed is:

1. A method of infusing a phytochemical, nutraceutical, flavor, or color composition into a food product, the method comprising:
   a. increasing brix of an osmotic dehydration solution comprising an osmotic dehydration solute and the food product over a period of time, wherein increasing brix is carried out by adding osmotic dehydration solute to the osmotic dehydration solution, replacing at least part of the osmotic dehydration solution, or a combination thereof, and
   b. incubating the food product with the phytochemical, nutraceutical, flavor, or color composition, thereby infusing the composition into the food product.

2. The method of claim 1, wherein the composition is a phytochemical.

3. The method of claim 1, wherein the composition is a nutraceutical.

4. The method of claim 1, wherein the food product is predried before infusing the composition into the food product.

5. The method of claim 1, wherein the solution comprises the composition.

6. The method of claim 1, comprising performing step (a) and step (b) separately.

7. The method of claim 1, comprising performing step (a) and step (b) simultaneously.

8. The method of claim 1, comprising varying the brix of the osmotic dehydration solution from about 20° B. to about 80° B.

9. The method of claim 1, comprising increasing the brix of the osmotic dehydration solution daily for a period of at least one week.

10. The method of claim 1, wherein the composition is a phytochemical or nutraceutical selected from: vitamins, minerals, isoflavoronals, lycopene, resveratol, indocarbonals, anthocyanins, soluble fiber, high protein rice, and soy isolate.

11. The method of claim 1, wherein the composition comprises a flavor, or a color.

12. The method of claim 1, wherein step (a) or step (b) is performed at room temperature.

13. The method of claim 1, wherein step (a) or step (b) is performed at about 50° C., and the brix of the osmotic dehydration solution is about 77° B.

14. The method of claim 1, further comprising stirring or circulating the osmotic dehydration solution, thereby increasing the rate of infusion of the composition into the food product.

15. The method of claim 1, wherein the food product comprises a strawberry and the brix of the osmotic dehydration solution is about 40° B.

16. The method of claim 1, wherein the food product comprises a marionberry and the osmotic dehydration solution contains high fructose corn syrup (HFCS).

17. The method of claim 1, wherein the food product comprises fresh sliced carrot, and the brix of the osmotic dehydration solution is about 77° B., said method further comprising heating the osmotic dehydration solution and incubating said solution overnight, wherein the composition comprises HFCS, Saw Palmetto, and Gingko Biloba.

18. The method of claim 1, further comprising coating the food product with a coating substance comprising gelatin, pectin, or starch to form a coated food product, and infusing the phytochemical into the coated food product.

19. The method of claim 1, wherein the osmotic dehydration solution comprising a dehydration solute selected from: high fructose corn syrup, dextrin, starch, gelatin, pectin, juice concentrate, and soy isolate.

20. The method of claim 19, further comprising heating the dehydration solute.

21. The method of claim 19, further comprising continuously circulating the dehydration solute.

22. The method of claim 19, further comprising circulating the dehydration solute and the food product through a tube or a pipe.

23. The method of claim 19, comprising passing the dehydration solute and the food product over a perforated conveyor, and collecting the food product therefrom.

24. The method of claim 1, further comprising pretreating the food product by freeze-drying the food product to 10% or lower residual moisture.

25. The method of claim 24, wherein the food product comprises a sliced cranberry, and the osmotic dehydration solution contains the phytochemical and HFCS, and the brix of the osmotic dehydration solution is about 77° B.

26. The method of claim 24, wherein the food product is a vegetable selected from: carrot, and bell pepper, and the osmotic dehydration solution comprises dextrose and L-Carnitine.

27. The method of claim 1, said method further comprising removing excess water by drying a mixture of the food product and the composition after incubation of the food product with the composition in step (b).

28. The method of claim 27, wherein the food product is selected from: fruit, fruit juice, vegetable, vegetable juice, ground liver, chicken, and salmon.

29. The method of claim 27, wherein the food product comprises apple or carrot.

30. The method of claim 27, wherein the food product comprises a prune or a prune slice, and the composition comprises an herbal medicine.

31. The method of claim 27, wherein the food product comprises prune juice, and the composition comprises an herbal medicine.

32. The method of claim 1, wherein the composition is a medicinal capable of providing a medical or dietary benefit to a human.

33. The method of claim 1, wherein the composition is a medicinal capable of providing a medical or dietary benefit to a non-human animal.

34. A method of infusing a flavoring into a fruit or a vegetable, the method comprising:

a. soaking the fruit or vegetable in a solution of potassium sorbite, calcium lactate, citric acid, glycerol, and the flavoring for at least three days;

b. removing 20% of the solution by weight each successive day;

c. replacing the removed solution with about 77° B. brix HFCS until the brix of the solution reaches about 65° B.;

d. rinsing the solution off the fruit or vegetable; and e. drying the fruit or vegetable.

35. The method of claim 34, wherein the fruit is selected from: blueberry, strawberry, marionberry, and cranberry.

36. The method of claim 34, further comprising adding one or more of: anthocyanins, and vitamin C, to the solution.

* * * * *